United States Patent [19]

Foster et al.

[11] Patent Number: 4,752,671
[45] Date of Patent: Jun. 21, 1988

[54] ELECTRIC IMMERSION HEATING ELEMENTS AND CONTROLS THEREFOR

[75] Inventors: Terrence J. C. Foster; Keith Fletcher, both of Buxton, England

[73] Assignee: Otter Controls Limited, Buxton, England

[21] Appl. No.: 865,714

[22] Filed: May 22, 1986

[30] Foreign Application Priority Data

May 22, 1985 [GB] United Kingdom ............... 8512957
Jul. 29, 1985 [GB] United Kingdom ............... 8519095

[51] Int. Cl.⁴ ............................................. H05B 1/02
[52] U.S. Cl. .................................. 219/330; 219/328; 219/437; 219/512; 337/336
[58] Field of Search ............... 219/328, 330, 331, 508, 219/512, 436, 438, 441, 442, 437; 337/335, 336

[56] References Cited

U.S. PATENT DOCUMENTS 3,976,966  8/1976  McIntosh et al. ............. 337/102 X
4,539,468  9/1985  Phillips et al. ....................... 219/330

FOREIGN PATENT DOCUMENTS

896116   5/1962  United Kingdom .
1470365  4/1977  United Kingdom ............. 219/437
1470366  4/1977  United Kingdom ............. 219/437
2097920  11/1982 United Kingdom ............. 219/437
2112209  7/1983  United Kingdom ............. 219/437
2120850  12/1983 United Kingdom ............. 219/328
2149217  6/1985  United Kingdom .

Primary Examiner—Patrick R. Salce
Assistant Examiner—Kristine Peckman
Attorney, Agent, or Firm—Pollock, Vande Sande & Priddy

[57] ABSTRACT

An element protector unit for an electrically heated water boiling vessel comprises primary and secondary bimetals responsive to the element head temperature and each arranged for actuating a respective one of primary and secondary switching contacts connected in the line and neutral sides of the element supply via respective push rods. The secondary bimetal and associated switch contacts provide back-up protection in the event of failure of the primary protection on account for example of welding of the primary switch contacts. The primary and secondary bimetals are partially overlapped in the element protector unit for correspondingly reducing the combined area they present to the element head, and the element head plate is provided with a double-dimple formation having a first portion adapted to nest with one of the two overlapped bimetals and a second portion adapted to nest with the other bimetal. By virtue of the overlapping of the bimetals and their nesting with the double-dimple formation in the element head a compact arrangement can be achieved conforming to current trend towards a compact element and element head design.

25 Claims, 8 Drawing Sheets

ELECTRIC IMMERSION HEATING ELEMENTS AND CONTROLS THEREFOR

FIELD OF THE INVENTION

This invention concerns electric immersion heating elements and controls therefor and more particularly concerns electrically powered heating elements for water heating vessels such as electric kettles, jugs, urns etc., and protective control devices for association therewith for interrupting the power supply to the heating element in the event of an element over-temperature condition such as might occur for example if the vessel were to be switched on without there being sufficient water in it or if the vessel were to boil dry.

BACKGROUND OF THE INVENTION

We have pioneered the concept of providing two independent thermal sensors, such as bimetallic elements for example and advantageously snap-acting bimetallic elements, in an element protector unit specially though not exclusively adapted for use with water boiling vessels formed of synthetic plastics materials, with the two independent sensors in effect providing primary and secondary protection with the secondary protection providing a back-up operative in the event that the primary protection fails. Our British Patent Specification No. 2,117,568 and corresponding U.S. Pat. No. 4,539,468 discloses such an element protection unit adapted to provide two separate levels of protection against dry switch-on dry situations, the unit comprising two independent thermal sensors each controlling a separate pair of switching contacts and each in thermally conductive relationship with the heating element. Reference may be had to GB Patent No. 2,117,568 or to U.S. Pat. No. 4,539,468 for a fuller appreciation of the double protection concept.

The difficulty has arisen in seeking to apply the aforementioned double protection concept to the present day hot water jugs formed from synthetic plastics materials and with the thermal sensors comprised by bimetallic elements that the relatively tall and slender design of the jugs, to be contrasted with the fat and squat shape of most electric kettles, has led to the element itself being of relatively compact design with very little space available in the element head for accommodating the bimetallic elements which, as will be appreciated, should be maintained in close thermal contact with the element head if a sufficiently fast response to an overheating condition is to be assured. We have been addressing ourselves to the solution of this problem and the present invention concerns a solution which we have devised.

SUMMARY OF THE INVENTION

In accordance with one aspect of the present invention, a two-level dimple formation is provided in an element head plate, the formation having a relatively recessed portion and an adjoining relatively projecting portion, and two bimetallic thermal sensor elements are mounted in partially overlapping relationship so that when the protective control device is assembled with the heating element one of the bimetallic elements is nested with the recessed portion and the other is nested with the projecting portion of the dimple formation. Thus, for example, in an exemplary embodiment of the invention having two generally rectangular bimetallic sensors provided in the control device and with the two bimetals aligned with each other and with one bimetal overlapping and slightly spaced above about half of the other, the formation in the heating element head plate comprises a generally rectangular dimple of a size to accommodate the two bimetals and having a first portion sized to correspond to the most forward one of the two bimetals and shaped to nest therewith and a second portion sized to correspond to the exposed (i.e. the non overlapped) part of the second bimetal and raised above the first part and shaped to nest with the exposed part of the second bimetal; this arrangement enables the two bimetals to be both in close heat transfer relationship with an element head of compact size.

As is well known, an electric heating element for a water boiling vessel conventionally has a hot return portion of the heating element proper brazed to the element head plate so that a portion of the head plate is closely thermally coupled with the heating element proper. In conventional protective heating element controls, it is known to provide a bimetallic or other thermal sensor element juxtaposed with the element head plate on the dry side thereof at a location which corresponds to the portion of the head plate which is closely thermally coupled with the heating element. By virtue of this arrangement the thermal sensor is closely thermally coupled with the heating element proper and can respond quickly and efficiently to an element over-temperature condition. The present invention, in a preferred embodiment, has one level of the two-level dimple formation closely thermally coupled with the heating element proper and the other level thereof more remotely thermally coupled with the heating element proper so as to exhibit a temperature variation which lags the temperature variation of the heating element. By virtue of this inventive arrangement the two bimetallic thermal sensors coupled to the element head in different types of thermal contact with the heating element proper so that, with identical bimetals employed for the two sensors, one bimetal will respond more quickly to an element over-temperature situation than the other. This arrangement thus is advantageous in that it defines one bimetal as being a primary sensor and the other as being a secondary sensor without need for the two bimetals to have different operating temperatures.

This arrangement furthermore has the added advantage in that in response to an element over-temperature condition, caused for example by switching on the heating element without sufficient water in the associated vessel, the bimetallic thermal sensor which is closely thermally coupled with the element hot return portion will respond first to the overtemperature condition and disconnect the supply of electric power to the heating element by opening a respective pair of contacts in the control. Thereafter, and given that the temperature of the element head will continue to rise after the element is switched off as the heat in the element proper is conducted into the element head, the second bimetallic thermal sensor which is not so closely thermally coupled with the heating element hot return portion will operate and will open its associated pair of contacts in the control. The pair of contacts associated with the second bimetallic sensor thus will open under no-current conditions and will not be subjected to any arcing and thus will in normal operation of the control be maintained in pristine condition so that, in the event of failure of the primary protection provided by the first bimetallic sensor and its associated pair of contacts, it will operate with certainty. Not only will the second bimetallic sensor operate to open its associated contacts after the first bimetallic sensor has operated, but also as the heating element cools subsequently so the second bimetallic sensor will cool to its reset temperature before the first bimetallic sensor thereby ensuring that in normal operation of the control the contact pair associated with the second bimetallic sensor will not only open under no-current conditions but also will subsequently reclose under no-current conditions.

Whilst it clearly is advantageous, particularly from a manufacturing standpoint, that the two bimetallic sensors should be identical, it is to be appreciated that the invention is not limited to the use of identical bimetallic sensors. The overlapping of the two bimetallic sensors inevitably means that one of them is shielded to a degree by the other from the heat of the element head and, whilst the double dimple formation provided in accordance with the present invention in the element head ensures effective heat transfer to both bimetallic sensors regardless of this shielding, it might be desirable for some applications to have two different sizes of bimetallic sensors in the control with the one which is partly shielded by the other having a correspondingly larger area in thermal contact with its respective portion of the double dimple formation.

The invention furthermore is not to be regarded as limited to an arrangement wherein the two bimetallic sensors are self-resetting, and in particular it may be arranged that the secondary bimetallic sensor and/or the contacts associated therewith latch in a condition such as to prevent the re-establishing of the supply of electric current to the heating element when the second bimetallic sensor operates following failure of the primary; in other words, it may be arranged that following failure of the primary protection and operation of the secondary protection, the secondary protection cannot reset to re-establish the potentially hazardous primary failure condition. This arrangement could for example be achieved by providing a latching means in the control for latching the secondary protection bimetal and its associated pair of contacts in open-circuit condition and arranging that the latching means can be reset only if there has been switch operating movement in the primary section of the control. Alternatively or additionally an indicator device such as a miniature neon lamp for example could be connected across the pair of switching contacts associated with the secondary bimetallic sensor for providing a warning of malfunction of the primary protection; as will be appreciated the neon lamp would be lit only in the circumstance where the secondary bimetal had operated to open its associated contacts and the primary had failed to open its contacts.

The present invention extends not only to a heating element configured with the inventive double-dimple formation for cooperation with a control device having overlapped bimetallic thermal sensors, but also extends to the control device per se and to the combination of the inventive control device with the inventive heating element. In dependence upon the precise mounting arrangement employed for the bimetallic sensors in the control and upon whether they project forwardly of the control for thermally contacting the element head plate and the extent of such projection or whether alternatively they are recessed into the control, the configuration of the nesting formation in the element head plate may be such that the formation is generally recessed into the head plate or alternatively generally projects therefrom, or even has one part generally recessed and the other part generally projecting as compared to the plane of the element head plate. Thus whereas in the foregoing the nesting formation in the element head plate has been said to comprise a recessed portion and a projecting portion, it is to be understood that the recession and projection of the respective portions is in each case relative to the other portion and not necessarily relative to the general plane of the heating element head plate.

The control device can be provided with a third thermal sensor arranged to be exposed to steam vented from an associated vessel when water boils therein and responsive thereto to open the electric circuit to the heating element. By virtue of this arrangement an automatic switching-off of the water boiling vessel is achieved when water boils in the vessel. The third thermal sensor can be a bimetallic sensor and can have a latching arrangement associated therewith for latching open the associated switching contacts until such time as the latch is reset. In a preferred arrangement the latch is constituted by a pivotally mounted lever having a spring urging the lever towards one or other of two stable positions on either side of an unstable central position (a so-called overcentre arrangement) with the free end of the lever arranged to operate the switching contacts. In a preferred embodiment, the pair of contacts operated by the said lever is one of the pairs of contacts associated with the first and second bimetallic sensors. The third bimetallic sensor, its mounting within the control device and the associated operating lever can be formed as integral parts of the control, or alternatively can be formed as an add-on unit adapted to cooperate with the basic control device.

A control device in accordance with the present invention could employ a variety of bimetallic sensors but the preferred sensor is a dished bimetallic blade which is movable between oppositely dished configurations with a snap action. Furthermore the preferred sensor is such a dished bimetallic blade formed with a generally U-shaped cut-out which releases a tongue portion from the surrounding parts of the blade, and the blade is preferably mounted by means of the tip end of such tongue. By virtue of such an arrangement, the blade movement and blade force can be optimised.

The invention together with other features aspects and advantages thereof, will become more clearly understood and appreciated from consideration of the following detailed description of exemplary embodiments which are illustrated in the accompanying drawings.

DETAILED DESCRIPTION OF THE EMBODIMENTS

Referring first to FIGS. 1A to 1D, these show an electric heating element of the immersion type which is adapted for use with an electric kettle or hot water jug or like water boiling vessel. The element comprises a resistance heating portion 1 and a head plate 2 which serves for mounting the element in an aperture in a wall of the vessel, the head plate 2 having screw-threaded fixing studs 3 on the dry side thereof and the cold tails 4 of the heating element portion 1 projecting through from the wet side of the head plate to the dry side for cooperation with the control which is to be described hereinafter. As may be seen from FIG. 1B, the element portion 1 has a low profile so that it requires only relatively little water in a vessel to cover the most effect part of the element, and the hot return portion 5 of the element is brazed over a relatively small area thereof to the wet side of the head plate 2 for ensuring efficient heat transfer through the head plate to the control mounted on the dry side thereof.

In the arrangement shown the screw-threaded fixing studs 3 serve for mounting the element to the vessel wall and also serve for mounting the hereinafter described control to the head plate 2. In an alternative arrangement, the head plate 2 could be provided on its dry side with an externally screw-threaded flange cooperating with an internally screw-threaded locking ring for mounting the element to the vessel wall, in which case the control could be mounted to he head plate either by means of screw-threaded studs such as the studs 3 or through the operation of the locking rings.

Figure 1A:
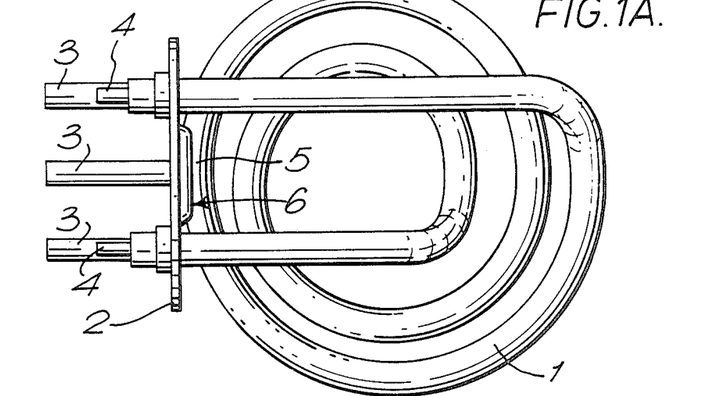
FIGS. 1A, 1B, 1C and 1D show an exemplary electric heating element configured in accordance with one aspect of the present invention, with FIG. 1A being a plan view, FIG. 1B a side elevation view, FIG. 1C an end elevation view showing the arrangement of the element head plate, and FIG. 1D a cross-sectional view on the line D—D in FIG. 1C.
Figure 1B:
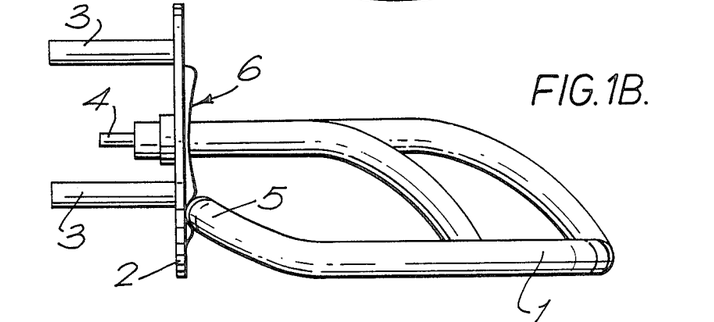
Figure 1C:
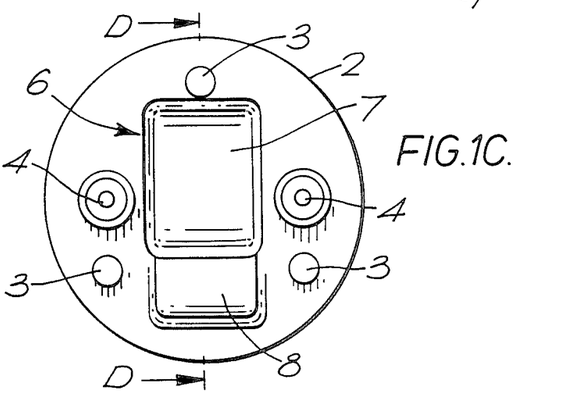
Figure 1D:
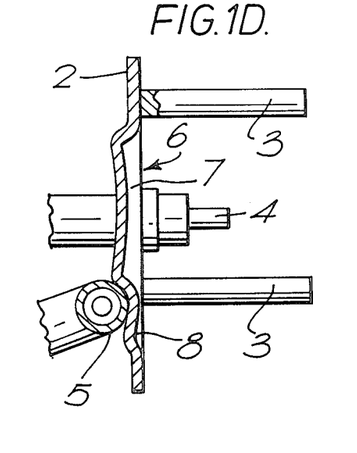
Figure 1E:
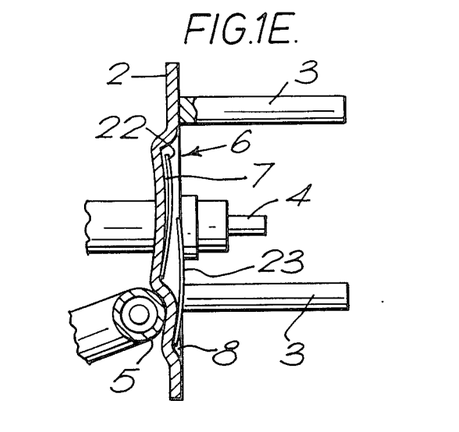
FIG. 1E is a view similar to FIG. 1D but also showing schematically the nesting of the bimetals with the element head formation.
Figure 1F:
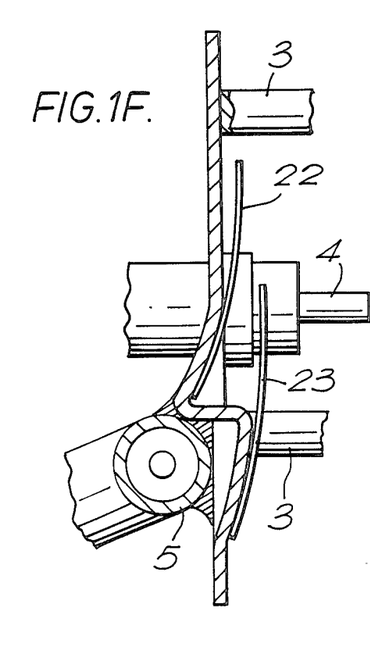
FIGS. 1F and 1G are detailed sectional showings of other exemplary heating element head plate configurations within the ambit of the present invention.
Figure 1G:
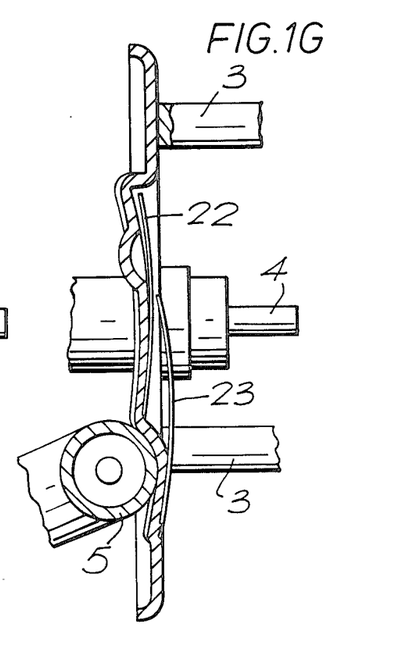

The feature of the described element which most characterises it in accordance with a first aspect of this invention is the provision of a two-level dimple formation 6 in the element head plate 2. This formation 6 is best seen in FIGS. 1C and 1D. The formation 6 may be formed by stamping the head plate, for example, and comprises a first generally-rectangular, relatively deep depression 7 having a convexly curved bottom surface as viewed from the dry side of the head plate 2, and a second generally rectangular, relatively shallow depression 8 adjacent the first depression 7 and having a convexly curved bottom surface which projects upwardly above the bottom surface level of the first depression 7. In use of the element with a control as described hereinafter, a first snap-acting bimetallic switching element 22 in the form of a dished rectangular bimetal blade nests in the first depression 7 in the cold state of the bimetal, and a second generally identical snap-acting bimetallic switching element 23 partially overlaps the first blade with a portion thereof nesting in the second depression 8 in the cold condition. The nesting of the two bimetals with the first and second depressions 7 and 8 is schematically represented in FIG. 1E with the bimetals shown in their cold condition. Slightly different element head plate configurations are shown in FIGS. 1F and 1G, and it is to be noted that the double-dimple formation is also profiled in a direction transverse to the plane of the figure so as to nest with the corresponding curvature of the bimetallic element in that direction.

With the two bimetal blades formed as typical "Otter Controls" bimetals as described for example in British Patent Specification No. 657434 and comprising a sheet or strip of bimetal from which a generally U-shaped cut-out has been removed so as to define a central tongue flanked by two outer legs, the legs being joined by a bridge portion opposite the free end of the tongue and the sheet or strip being stressed, as for example by crimping the bridge portion or by coining the blade, so as to impart a dished configuration to the sheet or strip which will snap between oppositely dished configurations with changes in temperature, and with the bimetals being mounted by virtue of the free ends of their tongues being staked or otherwise secured to a suitable support, the two bimetals can be mounted in close heat transfer relationship with the dimples provided in the element head plate 2 as will hereinafter be described and can be highly responsive to temperature changes in the heating element transmitted through the element head plate 2.

The bimetal blades do not have to be generally rectangular and neither do their accommodating formations in the element head plate. The bimetals could be circular for example as described in British Patent Specification No. 1542252 in which case the formation in the element could comprise a correspondingly circular relatively-deep first depression having a convex bottom surface, and a second relatively-shallow depression again with a convex bottom surface and shaped as a portion of a circle overlapping the first depression. Alternatively the bimetals could be generally pear shaped as described in British Patent Specification No. 2124429 for example, with the formations in the element head plate correspondingly shaped to nest with the bimetals.

By virtue of the described arrangement, a bimetal nested with the depression 8 will be in close heat transfer relationship with the hot return portion 5 of the heating element which is brazed to the element head plate 2 virtually opposite the bimetal position. Such a bimetal will thus be quickly responsive to overheating of the heating element. The other bimetal nested with the depression 7 will be in more distant heat transfer relationship with the hot return portion of the heating element. With two identical bimetals therefore, the bimetals would respond to an element overheating situation by the bimetal nested with the depression 8 operating first and the bimetal nested with the depression 7 operating subsequently. With the bimetal nested with depression 8 arranged to operate a first switch and the other bimetal nested with depression 7 arranged to operate a second switch, the second switch would open to break current only in a situation where the first switch or its operating bimetal failed. By this arrangement, the second switch would be maintained in good condition for when it was called upon to operate as a back-up for the first switch in the event of failure of the first switch. The use of identical bimetals is convenient for the manufacture of the associated element control, but is not an essential feature of the present invention and different bimetals with different operating characteristics could be employed.

Figure 2A:
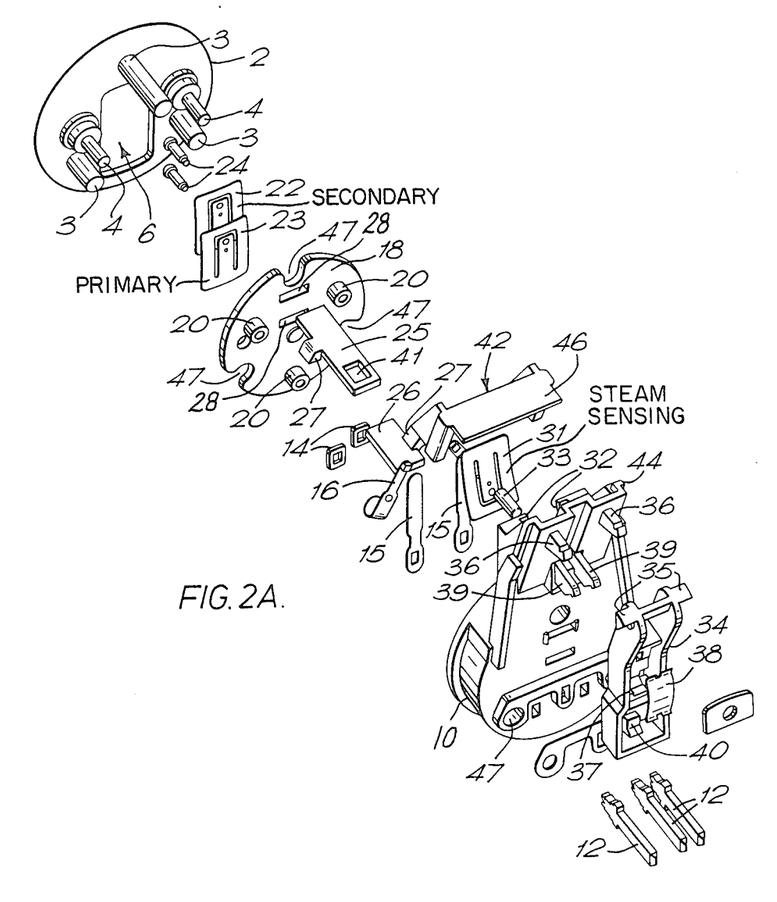
FIG. 2A is an exploded perspective view from a rearward direction of an exemplary heating element control unit in accordance with a second aspect of the present invention which is adapted for use with a heating element as shown in FIGS. 1A to 1G when mounted in a water boiling vessel.
Figure 2B:
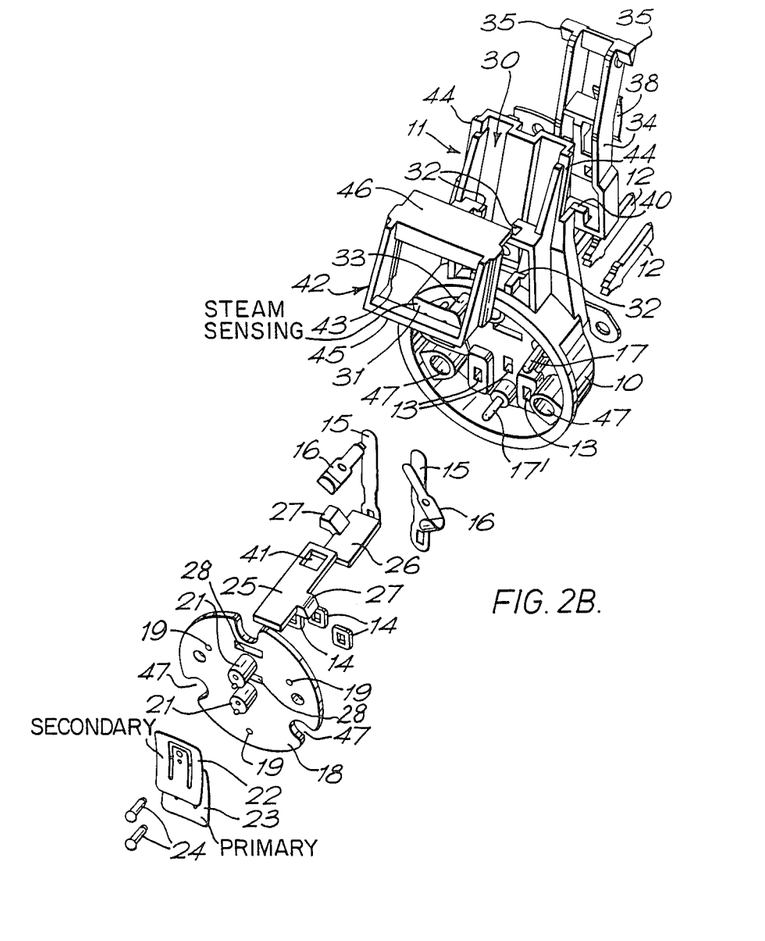
FIG. 2B is an exploded perspective view of the control unit of FIG. 2A from the other side.

Referring now to FIGS. 2A and 2B, there is shown therein a control adapted for use with a heating element as described in the foregoing. The control has three bimetals, namely first and second bimetals arranged to nest with the formations provided in the heating element head plate and each having an associated pair of switching contacts coupled in series with the heating element for protecting the element against an overtemperature situation arising on account of the element being powered without being immersed in water (a so-called dry switch-on situation), and a third bimetal which is a steam sensing bimetal and is arranged in use of the control to be exposed to steam venting from the associated vessel when water boils in the vessel, the third bimetal being coupled via an over-centre lever arrangement with one (at least) of the abovementioned pairs of switching contacts.

The control as shown comprises a generally cup-shaped plastics body moulding 10 having an integrally moulded upstand 11 serving, as will be described hereinafter in more detail, to accommodate the steam sensing bimetal. The body moulding 10 mounts live, neutral and earth terminals 12 which are formed with end portions which are passed through accommodating apertures 13 provided through the rear wall of the cup-shaped body moulding 10 and, within the cup, engage with rectangular fixings 14, the ends of the terminals 12 being split as shown and being peened apart when passed through the fixings 14 so as to retain the terminals 12 securely to the moulding 10. Mounted to each of the live and neutral terminals 12 within the cup is a spring metal strip 15 constituting a moving contact carrier of a respective one of two switching contact sets provided within the control, the respective terminal 12 extending through an aperture formed in the spring strip so that the spring strip 15 is secured by means of a respective one of the fixings 14.

The moving contact carriers constituted by the spring strips 15 are thus cantilevered within the cup of the body moulding 10 and at their free ends carry moving contacts of the switching contact sets. The moving contacts cooperate with fixed contacts provided at the ends of two further spring metal strips 16 which are mounted in the cup, integrally moulded posts 17 being provided in the cup and the spring strips 16 being mounted over the posts 17 which pass through holes formed in the spring strips 16. At the ends of the spring strips 16 opposite the contact-carrying ends the spring strips 16 are bent over for making spring loaded contact with the cold tails of the heating element as will be described.

A further moulded plastics part 18 cooperates with the body moulding 10, fitting within the open top of the cup of the body moulding 10 so as to form therewith a closed chamber within which the switching contact sets are contained. The posts 17 and a further similar post 17' pass through apertures 19 formed in the part 18 and are deformed by application of heat so as to rivet the body moulding 10 and the capping part 18 together. As shown most clearly in FIG. 2A, cylindrical bosses 20 are provided on the rear of the capping part 18 and these cooperate with formations within the cup of the body moulding 10 to clamp the fixed contact carrying spring strips 16. The posts 17,17' pass through the cylindrical bosses 20.

On the opposite side of the part 18 from the bosses 20, there are provided two mounting posts 21 serving for mounting first and second bimetal blades 22,23 which are secured to the posts 21 by means of hammer-drive screws 24 which pass through holes provided in the tongue portions of the bimetal blades. The upper one of the two mounting posts 21 (as viewed in FIG. 2B) is slightly taller than the lower post so that the first bimetal 22 is supported slightly forward of the second bimetal 23 and in overlapping relationship therewith. In this configuration, the first bimetal 22 nests with the deeper recess 7 in the element head plate aforedescribed, and the portion of the second bimetal 23 adjacent the root end of the released tongue thereof nests within the shallower recess 8.

First and second slides 25,26 cooperate with the bimetals 22,23 respectively for providing switch-actuating movement to respective ones of the switching contact sets constituted by the spring strips 15,16 and the contacts carried thereby, the slides 25,26 having lugs 27 which bear against respective ones of the moving contact carrying spring strips 15. The slides 25,26 are supported in slots 28 formed in the part 18 and in the body moulding 10 so as to be longitudinally movable, and at their forward ends bear against the bridge portions of the bimetals. When the bimetals snap to their oppositely dished configurations, the slides are moved to open their respective switching contacts.

The upper slide 25 is longer than the lower slide 26 and projects rearwardly through the back wall of the cup-shaped body moulding 10 for cooperation with the steam-sensing system of the control which will now be described. The integrally-moulded upstand 11 provided on the body moulding 10 defines a steam duct 30 which is adapted to receive steam vented from an associated water boiling vessel when water boils in the vessel and to direct the steam onto a third, generally rectangular bimetal 31 which is supported at its four corners by V-grooves 32 provided in the moulding. Switch operating movement of the bimetal 31 are developed at the tip of its released tongue, the bimetal 31 being of the same snap-acting kind as the bimetals 22,23, which translates as the bimetal moves between its oppositely dished configurations with changing temperature. A push rod 33 transfers this movement of the bimetal 31 to an over-centre trip lever 34 mounted on the back of the control.

The trip lever 34 is formed of moulded plastics and at its upper end as viewed in FIGS. 2A and 2B is provided with a pair of knife-edge formations 35 which engage in V-grooves provided in a pair of support members 36 (see FIG. 2A) provided on the back of the upstand 11. The lever 34 is thus pivotally mounted. Approximately midway along its length, the lever is formed with a V-mounting 37 for one end of a C-spring 38 the other end of which engages with inverted V-notches formed in a pair of supports 39 extending from the back of the moulding part 11. By virtue of this overcentre arrangement, the lever 34 is biassed by the C-spring 38 either clockwise or anti-clockwise depending on whether the inverted V-notches in the supports 39 lie to one side or to the other of a plane connecting the V-grooves in the support members 36 to the V-mounting 37. The arrangement thus is such that when the bimetal 31 is in its cold condition, the lever 34 can be pivoted inwardly towards the bulk of the control and will adopt a stable position until, in response to steam impinging on the bimetal 31, the bimetal 31 snaps to its oppositely dished configuration thereby causing push rod 33 to translate in its accommodating bore in the moulding part 11 and push the lever 34 outwardly past its central unstable position and into a second stable condition.

The lower end of the trip lever 34 has a toothed formation 40 which engages in an aperture 41 provided in the rearward end of the upper slide 25. Thus when the lever 34 is tripped by operation of the bimetal 31, its bottom end will pull on the slide 25 and will thereby cause the associated moving contact carrier 15 to be displaced so as to open the respective switching contacts and interrupt the supply of power to the heating element. The switch is then held open by the trip lever 34 until such time as the trip lever is reset. Thus, for example in use of the control with a kettle, when water boils in the kettle and steam is vented onto the bimetal 31, the bimetal will snap to its opposite condition thereby knocking out the trip lever 34 and opening the respective pair of switching contacts, and the control will then remain in that condition until such time as the trip lever is manually reset.

A moulded part 42 is formed with grooves 43 in its side walls which are a push fit onto complementary rails 44 on the moulding part 11. The part 42 has a lower cross-member 45 which serves to prevent the bimetal 31 from escaping from its mounting, and an upper cross-member 46 which serves to capture the pivotal engagement of the knife-edges formations 35 with the V-grooves to the support members 36.

Apertures 47 are provided in the body moulding 10 and in the capping part 18 for the passage of the element fixing studs 3 for attaching the control to the element of FIGS. 1A to 1D.

As thus described, the control is adapted to provide primary and secondary protection against an element overtemperature situation arising for example on account of an appliance being switched on without there being any water in it, this facility being provided by the two bimetals 22 and 23 and their associated switching contact sets. The control also provides an automatic steam-sensing switch-off facility through the bimetal 31 which acts through the trip lever 34 on the same pair of switching contacts as are operated by the bimetal 22. With the two bimetals 22 and 23 being identical or substantially identical to each other, in a dry switch-on situation giving rise to element overheating the bimetal 23 which is in closer heat transfer relationship to the hot return portion 5 of the element would tend to trip first, as has been explained hereinbefore. Subsequently, when the element overtemperature reaches the bimetal 22, it too will snap over to its oppositely dished configuration and through the action of its associated slide 25 will not only open the second pair of contacts but will also cause trip lever 34 to be tripped overcentre thereby latching the control in open-circuit condition until reset by depression of the trip lever subject to the element having cooled sufficiently to cause bimetl 22 to reset.

Of the two dry switch-on, element protection bimetals 22 and 23 therefore, the bimetal 22 has its associated switching contacts arranged to be latched open (by means of the trip lever 34) until manually reset once the bimetal senses an overtemperature condition. The bimetal 23 has its associated switching contacts arranged simply to open and close with the cylcing of the bimetal, there being no latching associated with the bimetal 23 or with its associated switching contacts. In certain circumstances it could be desirable to have the switching contacts associated with both bimetals arranged to latch open until reset, and there are various ways in which this could be done. For example, a latching device of the kind described in our British Patent Specification No. 2128409 with reference to FIG. 1 of the drawings thereof could be associated with a rearward extension of the lower slide 26 through the rear wall of the control body moulding 10. Alternatively, a second trip lever similar in construction and identical in function and operation to the trip lever 34 could be provided associated with the bimetal 23, its associated slide 26 and its associated pair of switching contacts. Such a second trip lever might for example be of generally U-shaped configuration with spaced-apart limbs defining the legs of the "U" extending one on each side of the trip lever 34 and pivoted at their upper ends coaxially with the pivotal mounting of the trip lever 34, and a bridging portion underlying the bottom end of the trip lever 34 and engaged with the slide 26 in similar manner to the engagement of the trip lever 34 with the slide 25. An overcentre biassing arrangement similar to that provided for the trip lever 34 would also be provided for the second trip lever.

With an arrangement as abovedescribed having two trip levers with the first being associated with the steam-sensing bimetal 31 and with the secondary element protector bimetal 22, and the second with the primary element protector bimetal 23, the arrangement would be such that in a normal automatic switch-off on boiling situation only the first trip lever would operate, and in a dry switch-on situation both the first and second trip levers would operate. In a dry switch-on situation, therefore, having remedied the situation by putting water into the associated vessel, the user in order to reset the control would have to remember to depress both the first and the second trip levers. This is only a minor inconvenience and it would readily be possible to provide the control with two reset knobs so interrelated that both knobs would be reset by the one operation.

Figure 3A:
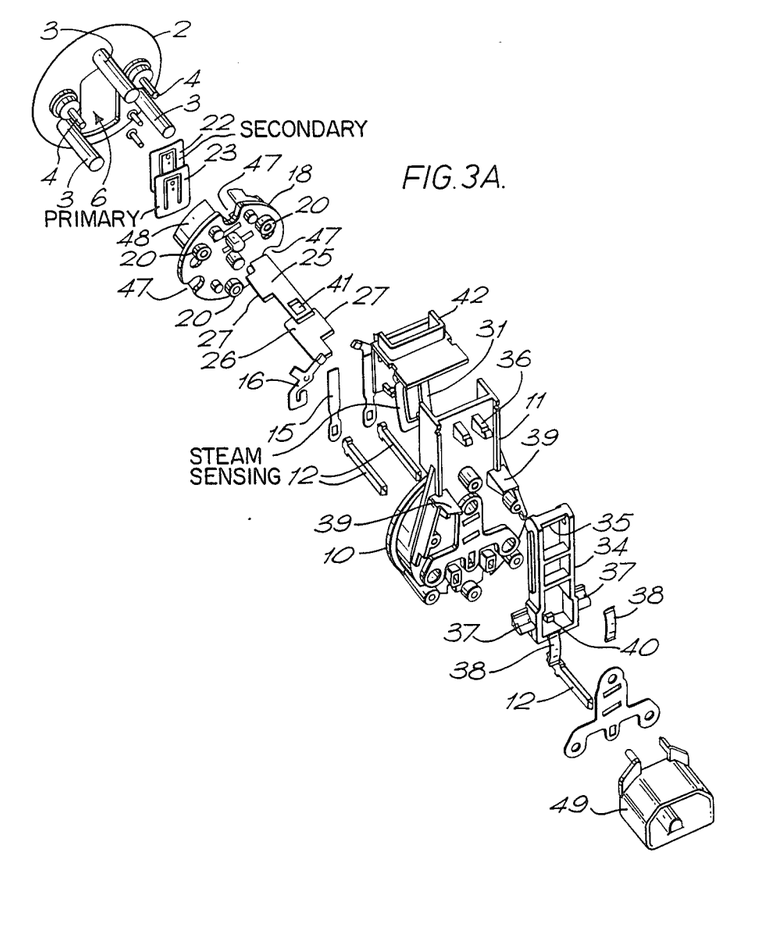
FIGS. 3A and 3B are views similar to those of FIGS. 2A and 2B showing another embodiment of the control according to the present invention.
Figure 3B:
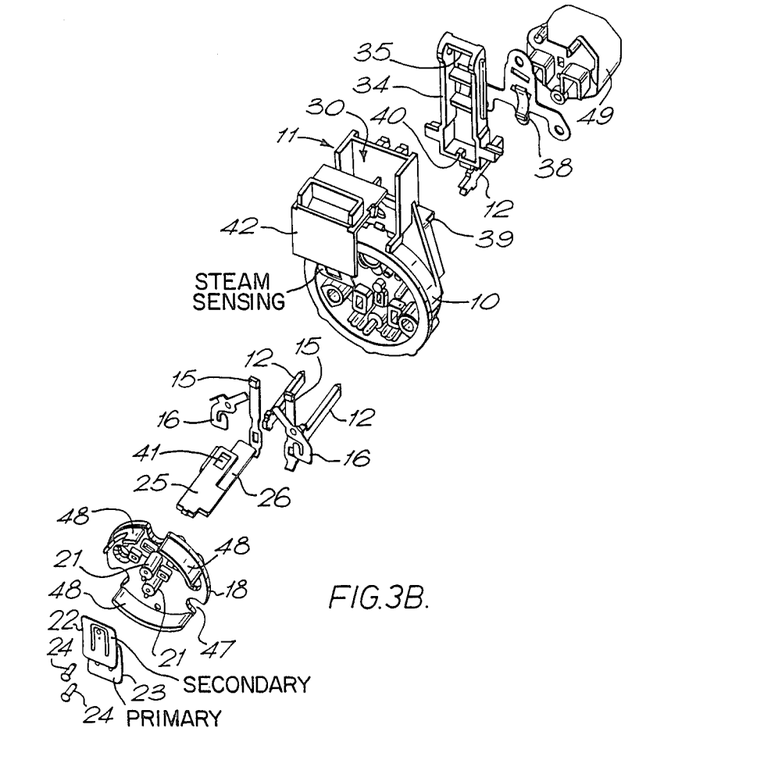

FIGS. 3A and 3B are views similar to those of FIGS. 2A and 2B of another embodiment of the present invention. The embodiment of FIGS. 3A and 3B has many similarities to the embodiment of FIGS. 2A and 2B and the same reference numerals are therefore used in the respective figures to denote identical and like parts. In view of the close similarities between these two embodiments, only their differences will be discussed herein and then only briefly.

As will be seen, the heating element head plate 2 and the nesting of the bimetals 22,23 with the double-dimple formation 6 in the head plate is identical in the embodiment of FIGS. 3A and 3B to the previously described embodiment, but the moulded plastics part 18 in the second embodiment is additionally formed with forwardly-extending skirt portions 48 which serve to determine precisely the positional interrelationship between the control device and the element head plate. The slide members 25 and 26 are slightly different as to form, but their function remains the same, and the same is the case in respect to the fixed contact-carrying strips 16. The part 42 which defines the steam duct for the passage of steam to the third bimetal 31 is different in design, but not in function, and the overcentre lever 34 has an inboard knife-edge pivot 35 as compared to the two outboard pivots provided in the first embodiment and has outboard mountings 37 for two C-springs 38 as opposed to the inboard mounting of a single C-spring of the first embodiment. Other differences are of no special concern to the pesent invention and it need additionally be noted only that the control as illustrated includes a connector inlet moulding 49 for receiving an appliance connector plug.

Figure 4:
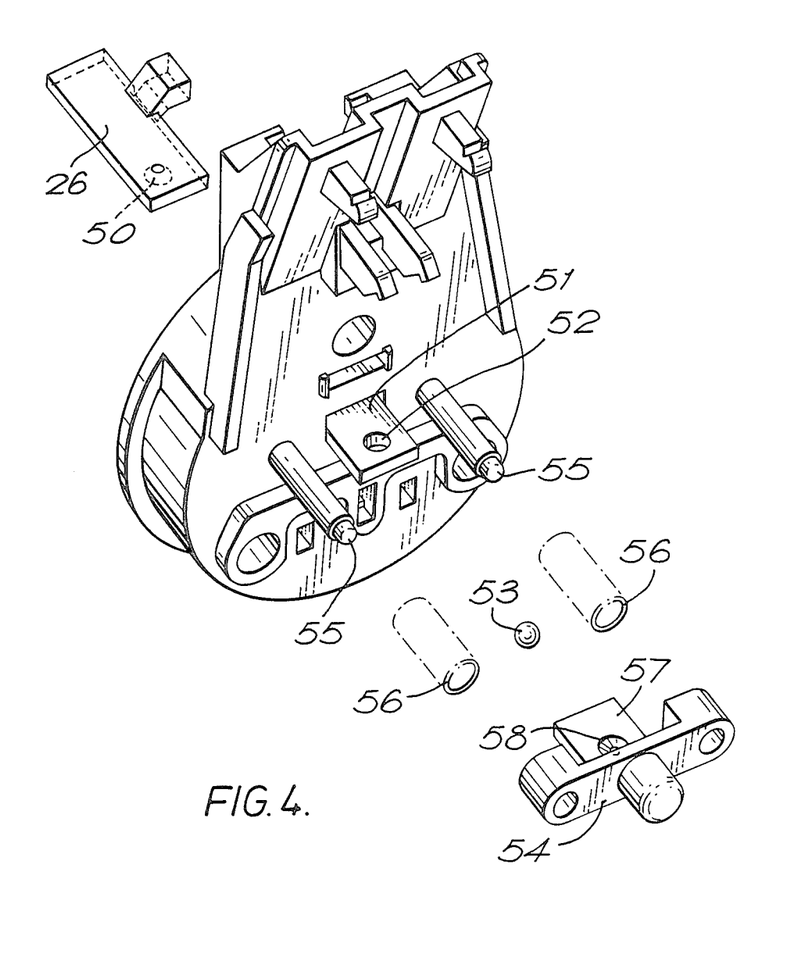
FIG. 4 is a perspective view showing a modification of the control of FIGS. 2A and 2B to effect latching of the primary switch contacts.

Another arrangement for latching the lower slide 26 in either of the above-described embodiments could be as illustrated in FIG. 4 of the accompanying drawings wherein there is shown a modified version of the body moulding 10 of the control of FIGS. 2A and 2B. As shown in FIG. 4, the lower slide 26 has a rearward extension formed with a recess 50 in its undersurface. Formed integrally with the body moulding 10 and projecting rearwardly therefrom on a level with the lower edge of the slot wherethrough the slide 26 projects in the assembled condition of the control is a formation 51 with a circular bore 52 for a close fitting glass or steel ball 53. A reset knob 54 formed as a unitary plastics moulding is adapted to be mounted on support posts 55 projecting from the rear of the body moulding 10 with coil springs 56 being assembled on the posts 55 between the reset knob 54 and the body moulding 10 so as to bias the knob outwardly away from the bulk of the control. The knob 54 has a portion 57 formed with a recess 58 on its upper surface similar to the recess formed in the lower surface of the slide 26.

The dimensions of the parts are such that the ball 53 can be accommodated only when either the recess 58 in the reset knob or the recess 50 in the slide is in registry with the bore 52 in the member 51. In the normal condition of the control, that is its reset condition, the slide 26 is forward so that the recess 50 is forward of the bore 52 and the rese knob 54 is in its reset position with the springs 56 compressed and the recess 58 in registry with the bore 52; the ball 53 thus serves to retain the knob 54 in its reset condition against the action of springs 56. When the slide 26 moves back under the action of the lower bimetal 23 and in response to an element overtemperature condition, the recess 50 moves into registry with the bore 52, the ball 53 then moves upwardly out of engagement with the recess 58 and the reset knob springs out under the action of the springs 56. The slide 26 is then latched in its rearward, contacts open, condition by engagement of the recess 50 with the ball 53, and will remain in this condition until such time as the knob 54 is depressed so as to bring the recess 58 into registry with the bore 52 and thereby enable the ball 53 to release itself from latching engagement with the slide 26.

Yet another possibility for latching the slide 26 would be to provide a latching mechanism the operation of which would be dependent upon the presence of an appliance connector in the connector inlet 49 of the control of FIGS. 3A and 3B, it being appreciated that the control as described with reference to Figures 2A and 2B will also be enclosed by means of a suitable housing having formed therein a connector inlet wherein the terminals 12 are received. The arrangement could for example be such that the insertion of the appliance connector into the connector inlet of the control caused a latching mechanism to be armed so that a member thereof moved into latching position for engaging the slide 26 when it moved under action of its actuating bimetal. For releasing the latch, it could be arranged to be necessary only to remove the appliance connector from the connector inlet thereby enabling the latching mechanism to disarm and release the slide assuming its associated bimetal was in condition to enable the slide to release.

Such a connector-related latching arrangement could take many different forms and merely requires that a first part project into the connector inlet so as to be moved by insertion of the appliance connector into the connector inlet, and a second part be moved in response to such movement of the first part from an inoperative position into a latching position, the movements being reversible on withdrawal of the appliance connector from the connector inlet of the control even when the second part is actually latching the associated switch. Many different arrangements satisfying these criteria will readily occur to those possessed of appropriate skills, and one convenient arrangement is illustrated in FIGS. 5A, 5B, and 5C of the accompanying drawings to which reference may now be made.

Figure 5A:
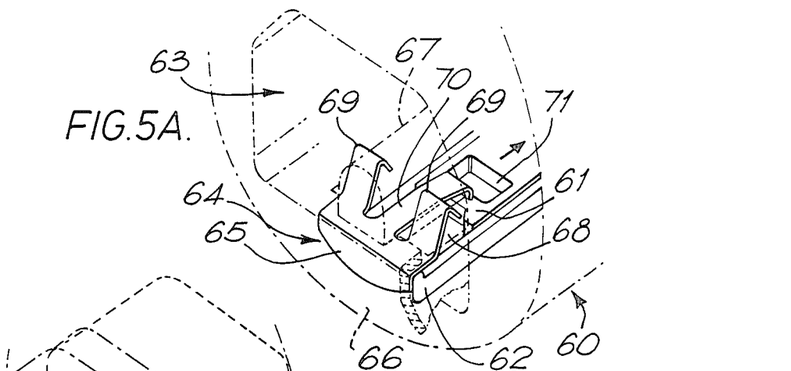
FIGS. 5A, 5B and 5C show an alternative latching arrangement which could be used in the practice of this invention.
Figures 5B, 5C:
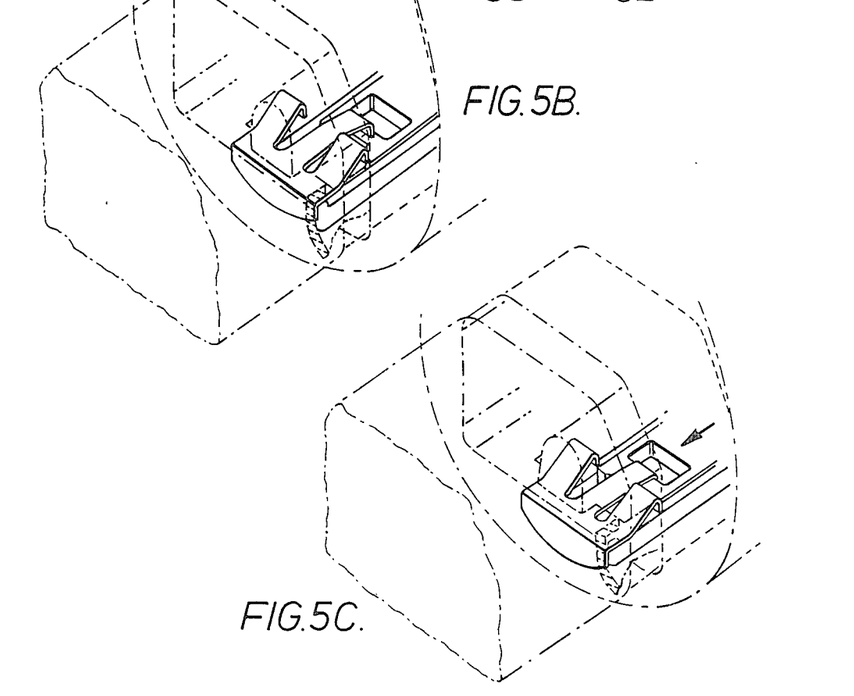

For the sake of clarity, FIG. 5A is drawn to a larger scale than FIGS. 5B and 5C. Furthermore, FIG. 5A shows the situation of the latching arrangement when the appliance connector is not in the connector inlet of the control, whereas FIGS. 5B and 5C show the situation when the appliance connector is inserted. Finally, the control itself is shown only schematically in these figures and does not necessarily correspond to the control hereinbefore described with reference to FIGS. 2A and 2B or FIGS. 3A and 3B, though these controls could readily be modified to incorporate a latching arrangement as shown in FIGS. 5A, 5B and 5C.

FIG. 5A shows a schematically-illustrated control 60 wherein a bimetal (not shown) or other temperature sensitive switch actuator in heat transfer relationship with the head portion of a heating element for example is arranged to move a slide member 61 in order to move a switch contact carrying member. The slide member 61 is supported by means of a guide member 62 for movement in the directions of the arrows drawn in FIGS. 5A and 5C, the guide member 62 extending beneath the connector inlet 63 of the control. A latching member 64 formed of spring metal for example is seated at the outermost end of the guide member 62 and has a portion 65 which is clamped between the end surface of the guide member 62 and the rear wall 66 of the control enclosure so as to determine the basic attitude of the latching member 64. The connector inlet 63, as is conventional, is provided with a central polarizing key structure 67 and on either side of this there is an aperture 68 in the base of the connector inlet 63. The latching member has a pair of upwardly extending fingers 69 which project through the apertures 68 into the path of an appliance connector being inserted into the inlet 63. Intermediate the upwardly extending fingers 69 there is a forwardly extending finger 70 having a downwardly turned tip.

In the relaxed condition of the latching member 64, that is when the appliance connector is not inserted into the inlet 63 of the control, the forwardly extending finger 70 has its downwardly turned tip slightly above the slide member 61 so as not to engage the slide. When an appliance connector is inserted into the inlet 63, the connector urges the spring fingers 69 downwardly out of its path which applies a turning force to the spring finger 70 so as to cause its downwardly turned tip to bear down upon the slide member 61 as illustrated in FIG. 5B. When, in response to a temperature change, the slide member 61 moved rearwardly as depicted in FIG. 5C, so the downwardly turned tip of the finger 70 engages with an aperture 71 formed in the slide. When, with decreasing temperature, the thermal sensor responsible for movement of the slide resets, the slide itself will remain in latched condition, being held by the spring finger 70. To release the latch, the appliance connector is simply removed from the connector inlet whereupon the spring finger 70 reslides to its original condition and releases its engagement with the slide member 61.

As shown, the ends of the spring fingers 69 are turned over so as to present a smooth rubbing surface for engagement by an incoming appliance connector and provide little hindrance to the insertion of the connector. If it were desired to increase the restoring force provided by the fingers 69, that is the force tending to lift the central finger 70 out of engagement with the slide 61 once the appliance connector had been removed, the downwardly turned ends of the fingers 69 could be extended downwards and curved into sliding contact with the guide member 62.

In the arrangement shown in FIGS. 5A, 5B and 5C, the latching member 64 is provided at the bottom of the connector inlet, but it could equally well be provided at the top of the connector inlet for cooperation with a correspondingly positioned slide member extending above, rather than below, the connector inlet. The arrangement might be thus adapted for use with the controls of FIGS. 2A and 2B and FIGS. 3A and 3B described hereinbefore.

Having thus described some embodiments of the present invention in its various aspects, it is to be appreciated that variations and modifications could be made thereto without departure from the spirit and scope of the invention. In particular, whilst the controls of FIGS. 2A and 2B and FIGS. 3A and 3B comprise three-bladed controls, comprising one steam-sensing bimetal blade and two element protector blades, many of the constructional features described are clearly applicable to an element protector control comprising only the two element protector blades and not the steam-sensing blade, its mounting, and its associated overcentre arrangement, and would be equally applicable to an element protector/steam sensing control comprised of only one element protector bimetal rather than two. In smaller fashion, the described latching arrangements have wide application and are not to be regarded as restricted to the described controls.

What is claimed is:

1. In combination, an electrically powered heating element for a water boiling vessel and an element protection unit for protecting the heating element against overheating, the heating element comprising a resistance heating portion and an element head portion, the element head portion serving for mounting the heating element to said vessel, and the element protection unit being adapted to be mounted in heat transfer relation with the heating element so as to be subjected to heat developed in the element head portion when the heating element is powered and serving for determining supply of power to the heating element in the event of overheating of the same, the element protection unit comprising first and second bimetallic elements and switch means responsive individually to the condition of said bimetallic elements for determining the supply of power to the heating element, said bimetallic elements being mounted one behind the other in the element protection unit in partially overlapping relationship and the element head portion having a formation provided therein which has a profile which is complementary to a cold condition profile of the partially overlapped first and second bimetallic elements, said formation having a first part configured for nesting with that one of the first and second bimetallic elements which is uppermost in the partially overlapped arrangement when it is in its cold condition and a second part configured for nesting with that port of the other of said first and second bimetallic elements which is not overlapped when such bimetallic element is in its cold condition, the arrangement thereby enabling the element protection unit to be mounted in a vessel with both of said first and second bimetallic elements in close thermal contact with the head portion of the heating element and yet so as together to present to the heating element head portion an area smaller than the sum of their individual areas.

2. In combination, an electrically powered heating element for a water boiling vessel and an element protection unit for protecting said electrically powered heating element against overheating due to a dry switch-on or boil-dry situation, said protection unit comprising primary and secondary thermal sensors in the form of primary and secondary bimetallic elements arranged to be located in thermal contact with the said heating element and primary and secondary electrical switches arranged to be controlled in dependence upon the conditions of said primary and secondary thermal sensors, said primary and secondary switches being arranged so as each to determine supply of electrical power to the heating element such that in the event of overheating of said heating element secondary protection provided by the secondary thermal sensor and its associated secondary electrical switch is effective to disconnect the heating element if the primary protection fails, and the primary and secondary bimetallic elements being partially overlapped within the protection unit so as to present to the heating element a combined area less than the sum of the areas of the two bimetallic elements, and the heating element having a head plate wherein there is provided a formation having a profile which is complementary to a cold condition profile of the partially overlapped primary and secondary bimetallic elements, such formation having a first part configured for nesting with the primary element and a second part configured for nesting with the secondary element in each case in a cold condition of the respective bimetallic element whereby the primary and secondary bimetallic elements are capable of each being brought into close heat transfer relationship with respective parts of said complementary formation provided on the head plate of the heating element.

3. In combination, an electrically powered heating element for a water boiling vessel and an element protection unit for protecting the heating element against overheating due to a dry switch-on or boil-dry situation, said unit comprising primary and secondary safety cut-outs each functioning as a thermal sensor and comprising a bimetallic blade arranged to be located in intimate thermal contact with the said heating element and an associated electrical switch arranged to be controlled in dependence upon the condition of said bimetallic blade, the electrical switches of said primary and secondary cut-outs being arranged in the unit so as to determine supply of mains electrical power to the heating element, and the cut-outs being such that, in the event of said heating element overheating above its normal operating temperature encountered when water is boiling in the vessel, the secondary protection provided by the secondary safety cut-out can be effective, independently of the primary safety cut-out, to disconnect the heating element from its power supply even if the primary protection provided by the primary safety cut-out fails, the two bimetallic blades being mounted in the unit in partially overlapping relationship for reducing the area requirement for thermally contacting the two bimetallic blades with the heating element, and the heating element having a head portion wherein there is provided a formation having a profile complementary to cold condition profiles of the partially overlapping primary and secondary bimetallic blades, such formation having a first part configured for nesting with the primary blade and a second part configured for nesting with the secondary blade in each case in a cold condition of the respective blade whereby both of said bimetallic blades in their cold conditions can locate an intimate thermal contact with the element head portion for efficient transfer of heat thereto fromthe head portion.

4. The combiantion according to claim 3 wherein each said bimetallic blade is dished so as to be movable with a snap-action between oppositely curved configurations.

5. The combination according to claim 3 wherein said element protection unit comprises a first body portion, power supply pins secured to said first body portion for connection thereto of a mains electrical power supply connector, a second body portion secured to said first body portion so as to define a chamber between said first and second body portions, said second body portion including mountings for the primary and secondary bimetallic blades, first and second electrical switching contact sets including first and second movable contacts and first and second fixed contacts and constituting the electrical switches of said primary and secondary cut-outs secured within said chamber, said fixed contacts being arranged to contact terminals of the heating element, and means extending through said second body portion for transmitting operational movements of said primary and secondary bimetallic blades to moving contact carriers of said primary and secondary electrical switches.

6. The combination according to claim 3 wherein said element protection unit further comprises a third bimetallic sensor serving as a steam-sensitive switch-actuating element for operating at least one of said electrical switches via movement transmitting means when, in use of the unit with a water boiling vessel, steam generated when water boils within the vessel impinges upon said third bimetallic sensor.

7. The combination according to clam 6 wherein said third bimetallic sensor is arranged in said unit such that switch-actuating movement thereof is coupled via a resettable over-centre arrangement to at least one of said primary and secondary electrical switches whereby when said over-centre arrangement has been tripped by said third thermal sensor the at least one of said primary and secondary switches which is associated therewith remains in its open condition until the over-centre arrangement is reset.

8. The combination according to claim 7 wherein said over-centre arrangement is arranged to be tripped in response to operation of at least one of said primary and secondary bimetallic sensors in addition to being responsive to operation of said third thermal sensor.

9. The combination according to claim 3 wherein the arrangement of the secondary cut-out is such that, having once operated in response to a substantial overheating situation following failure of the primary cut-out, it is inhibited from resetting itself and re-establishing the supply of power to the heating element in response to a subsequent cooling of the heating element.

10. The combination according to claim 9 wherein latching means are provided associated with at least said secondary cut-out.

11. The combination according to claim 10 wherein said latching means is arranged to be manually releasable by removing on electric power supply connector plug from a connector inlet of the unit.

12. The combination according to claim 3 wherein the heating element comprises a resistance heating portion having a hot return portion connected to the head portion and the first part of said formation in the head portion of the heating element is arranged to be in intimate thermal contact with said hot return portion and the second part is in more remote heat transfer relationship with said hot return portion.

13. In combination with a water boiling vessel, an electrically powered heating element for heating water contained in the vessel up to boiling temperature, and an element protection unit for protecting the heating element against being overheated by virtue of power being supplied to the element when there is insufficient water in the vessel, the heating element comprising a resistance heating portion and an element head portion, said element head portion serving for mounting the element in the vessel, and the element protection unit being mounted to the element head portion so as to be subjected to being heated by heat developed in the head portion when the heating element is powered, the element protection unit comprising first and second safety cut-out switches coupled in series with one another and with the resistance heating portion of the heating element between power supply terminals of the element protection unit and providing primary and secondary protection for the heating element respectively, said first and second safety cut-out switches comprising first and second snap-acting bimetallic blades mounted in partially overlapping relationship with each other and each nesting in cold conditions with a respective part of a two-part complementary formation provided in the element head portion so as each to be in close heat transfer relationship with a respective part of the element head portion and providing thermally-responsive contact-opening movements via an electrically insulating coupling to first and second pairs of switching contacts each comprising a fixed contact and a omvable contact, the bimetallic blade of the first cut-out being arranged to be in close heat transfer relationship with a part of the element head portion which is intimately heated by a hot return portion of the resistance heating portion of the heating element, and the bimetallic blade of the second cut-out being arranged to be in close heat transfer relationship with a part of the element head portion which is in more remote heat transfer relationship with the hot return portion of the heating element, the element protection unit being such that in normal operation the first cut-out will operate in response to an element over-temperature condition before the second cut-out.

14. The combination according to claim 13 wherein the second cut-out is arranged so as, having once operated in response to an element over-temperature situation, to be inhibited from resetting itself so as to re-establish the supply of power to the heating element in response to a subsequent cooling of the heating element.

15. The combination according to claim 13 or 14 wherein said first and second bimetallic blades are set to operate at substantially the same temperature.

16. The combination according to claim 13 or 14 further comprising steam sensing means associated with the element protection unit and arranged for operating at least one of said first and second cut-out switches in response to the generation of steam when water boils within the vessel and the impingement of said steam upon said steam sensing means, said steam sensing means comprising a third snap-acting bimetallic blade located for the impingement thereon of steam when water boils within the vessel, and coupling means being provided for transmitting the operating movement of such thid bimetallic blade to at least one of said pairs of switching contacts of said first and second cut-out switches, said coupling means comprising an overcentre arrangement designed to latch-out in response to generation of steam when water boils in said vessel so as to maintain the heating element in unpowered condition at least until such time as said overcentre arrangement is reset.

17. The combination according to claim 13 or 14 wherein manually releasable latching means are associated with at least one of said cut-out switches and the latching means is releasable by removal of the power supply connector plug from a connector inlet of the element protection unit.

18. In combination with an electrically heated water boiling vessel, an electric heating element and an element protector and steam sensing unit for switching off the heating element in the event of an element overheating condition occasioned by the element being switched on without there being sufficient water in the vessel and also when water boils in the vessel, the heating element comprising a resistance heating portion for heating water in the vessel and an element head portion serving for mounting the heating element in the vessel, and the element protector and steam sensing unit comprising a first part mounted adjacent the element head portion so as to be subject to heat developed at the head portion by virtue of the powering of the heating element and a second part arranged to be subject to steam vented from inside the vessel when water boils in the vessel, said first part comprising first and second dished bimetallic elements capable of moving between oppositely dished configurations with a snap action arranged in close thermal contact with the element head portion and first and second pairs of switching contacts coupled with said first and second bimetallic elements via electrically-insulating movement-transferring means for transferring the bimetallic element movements into switching movements of the respective switching contact pairs, and said second part comprising a third bimetallic element subject to heating by steam vented from the vessel and movement-transferring means associated with said third bimetallic element for transferring movement therefrom to at least one of said first and second pairs of switching contacts for initiating switching movements thereof, said first and second bimetallic elements being mounted in partly overlapping relationship with each other and the element head portion having a two-part formation comprising a first part configured for nesting with one of said first and second bimetallic elements and a second part for nesting with the other of said first and second bimetallic elements in each case in its cold configuration, one of the two parts of said formation being in registry with a hot return portion of the resistance heating portion of the heating element, such hot return portion being in thermal contact with the element head portion, and the other part being thermally more remote from the said hot return portion, there thus being a thermal lag between heating of the first and second bimetallic elements in an overtemperature condition of the heating element.

19. The bomcination according to claim 18 wherein said first and second bimetallic elements are substantially identical at least as regards their temperature reponse characteristics.

20. In combination with an electrically heated water boiling vessel, an electric heating element and an element protection unit for switching off the heating element in an element overheating situation caused by the element being powered when there is insufficient water in the vessel, the heating element comprising a resistance heating portion arranged for heating water in the vessel and an element head portion serving for mounting the heating element with respect to the vessel, the resistance heating portion of the element having cold tails projecting through the element head portion and including a hot return portion contacting the element head portion on one side thereof, and the element protection unit being assembled to the element head portion on another side thereof opposite from the resistance heating portion of the heating element and comprising primary and secondary cut-out switches connected in series with the resistance heating portion of the heating element and serving for switching off the heating element in an element overheating situation, the secondary cut-out switch being arranged to operate at a higher element temperature than the primary cut-out switch and serving as a back-up for the primary cut-out switch in failure to operate of the same, each of said primary and secondary cut-out switches comprising a pair of switching contacts comprising a first contact engaged with a respective one of the cold tails of the resistance heating portion of the heating element and a second contact engaged with a respective one of a pair of supply terminals provided in the element protection unit for coupling of an electrical power supply thereto, one of said first and second contacts being mounted on a moving contact carrier which is coupled via an electrically-insulating movement-transferring member with a respective one of first and second snap-acting bimetallic members constituting prime movers of the primary and secondary cut-out switches respectively, said first and second bimetallic members being mounted in partly overlapping relationship with each other and each in intimate heat transfer relationship with a respective part of a two-part formation provided on said other side of the element head portion, said two-part formation being configured for nesting with the first and second bimetallic members in a cold condition thereof and that one of said two parts which nests with the first bimetallic member being in close thermal contact with the hot return portion of the heating element whereas the other of said two parts is thermally more remote from said hot return portion, and means operatively associated at least with said secondary cut-out switch and arranged such that, said secondary cut-out switch having operated in response to an element overheating situation following failure of said primary cut-out, said secondary cut-out is inhibited from resetting itself so as to re-establish the power supply to the heating element in response to subsequent cooling of the heating element.

21. The combination according to claim 20 wherein said first and second bimetallic elements are substantially identical at least as regards their temperature reponse characteristics.

22. The combination according to claim 20 or 21 wherein the said movement-transferring member of one or said primary and secondary cut-out switches is coupled with a further thermal sensor provided in the element protection unit for operation of the respective electrical switch thereby, such further thermal sensor being arranged so as to serve as a steam-sensitive switch-actuating element for operating the respective cut-out switch via the respective said movement-transferring member when steam generated by water boiling in the vessel vents onto said further thermal sensor.

23. The combination according to claim 22 wherein an overcentre latching arrangement is provided between said further thermal sensor and said at least one cut-out switch.

24. The combination according to claim 1 wherein said element protection unit comprises means defining a connector inlet for receiving a power supply connector plug, and manually-releasable latching means associated with said switch means for latching the same in a condition to switch off the heating element until the latching means is released, said latching means being associated with the connector inlet and being arranged so that once operated in response to an element overtemperature condition it can be released by removal of the power supply connector plug from said connector inlet.

25. The combination according to claim 24 wherein said latching means comprises a spring member operatively associated with said connector inlet so as to be biassed by insertion of a connector plug into said connector inlet into a potentially latching position and returnable when the plug is removed into a non-latching position, the spring member being further arranged so that when it is in its potentially latching position the operation of said switch means in response to an element overtemperature condition will cause a latching engagement to be effected between a portion of the spring member and a part of the switch means.

* * * * *